(12) United States Patent
Park et al.

(10) Patent No.: US 7,090,790 B2
(45) Date of Patent: Aug. 15, 2006

(54) CHEMILUMINESCENT COMPOSITION PRODUCING WHITE LIGHT

(75) Inventors: Hee-Jung Park, 13-1002 Garam Apt., Samcheon-Dong, Seo-Gu, Daejeon (KR); Yong-Rai Kim, 106-303 Sangrokmaeul, Jungja-Dong, Bundag-Gu, Sungnam-City, Kyunggi-Do (KR); Yong-Fan Kim, Gongju-Si (KR); Koon-Ha Park, Daejeon (KR); Jong-Hun Baek, Seoul (KR)

(73) Assignees: Hee-Jung Park, (KR); Yong-Rai Kim, (KR)

( * ) Notice: Subject to any disclaimer, the term of this patent is extended or adjusted under 35 U.S.C. 154(b) by 158 days.

(21) Appl. No.: 10/813,959

(22) Filed: Mar. 30, 2004

(65) Prior Publication Data

US 2005/0224768 A1  Oct. 13, 2005

(51) Int. Cl.
  *C09K 3/00* (2006.01)
  *F21K 2/00* (2006.01)
  *G02F 1/361* (2006.01)
(52) U.S. Cl. .................. 252/700; 252/582; 252/586; 362/34
(58) Field of Classification Search .............. 252/700
  See application file for complete search history.

(56) References Cited

U.S. PATENT DOCUMENTS

| 4,678,608 | A | * | 7/1987 | Dugliss | .............. | 252/700 |
| 4,717,511 | A | * | 1/1988 | Koroscil | .............. | 252/700 |
| 5,597,517 | A | * | 1/1997 | Chopdekar et al. | ......... | 257/700 |
| 5,705,103 | A | * | 1/1998 | Chopdekar et al. | ......... | 252/700 |
| 2003/0111649 | A1 | * | 6/2003 | Park et al. | .............. | 252/700 |
| 2003/0116759 | A1 | * | 6/2003 | Park et al. | .............. | 252/700 |

OTHER PUBLICATIONS

"Synthesis and Evaluation of Fluorescent Materials for Colour control of Peroxyoxalate Chemiluminescence. III Yellow and Red Fluorescent Emitters"; Authors: Peter J. Hanhela and D. Brenton Paul; Aust. J. Chem., 34; 1981; pp. 1701-1717.

"Chemiluminescence from Reactions of Electronegatively Substituted Aryl Oxalates with Hydrogen Peroxide and Fluorescent Compouns"; Authors: M.M. Rauhut, et al.; Journal of the American Chemical Society, 89:25; Dec. 6, 1967; pp. 6515-6522.

* cited by examiner

*Primary Examiner*—Randy Gulakowski
*Assistant Examiner*—Timothy J. Kugel
(74) *Attorney, Agent, or Firm*—Cantor Colburn LLP

(57) ABSTRACT

Disclosed herein is a chemiluminescent composition that can produce bight pure white light even at a low temperature. The chemiluminescent composition producing white light comprises a blue or green fluorescer or a mixture thereof as a fluorescer, and a 1,6,7,12-tetrahaloperylenedicarboximide represented by Formula 3

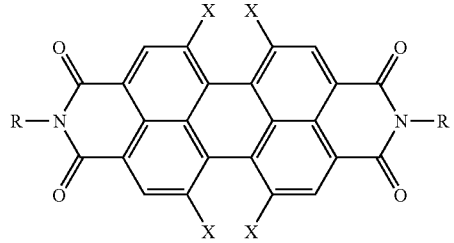

wherein R is an alkyl or aryl group and X is Cl or Br.

17 Claims, No Drawings

CHEMILUMINESCENT COMPOSITION PRODUCING WHITE LIGHT

BACKGROUND OF THE INVENTION

1. Field of the Invention

The present invention relates to a chemiluminescent composition producing white light, and more particularly to an oxalate chemiluminescent composition capable of stably emitting brighter and purer white light even at low temperature.

2. Description of the Related Art

A general oxalate chemiluminescent composition comprises an oxalate solution and an activator solution wherein the oxalate solution includes an oxalate compound, a fluorescer and a solvent, and the activator solution includes hydrogen peroxide, a solvent and a catalyst. These components of the chemiluminescent composition are mixed in predetermined ratios to cause chemiluminescence. It is well established that favorable chemical/physical interactions are essential between the components for effective chemiluminescence, and also that the emitting light depends on the fluorescer.

Chemiluminescence in the oxalate chemiluminescent composition can be understood by a series of continuous multi-step chemical reactions. In the first stage, hydrogen peroxide and oxalate undergo reactions in an ester solvent, aided by a salicylate salt, producing an organic intermediate in an excited state. In the second stage, an excited fluorescer is produced through energy exchange between the excited organic intermediate and a fluorescer in a ground state. In the third stage, a ground state fluorescer is formed from the excited fluorescer by emitting light at the expense of extra energy [*J. Amer. Chem. Soc.* 89(25), 6515–6522 (1967); and *Aust. J. Chem.* 34, 1701–1717 (1982)].

Since the color of the light emitting from the oxalate chemiluminescent composition depends on the fluorescer, continuous efforts to develop a new fluorescer have been carried out up to present. But successful reports of a fluorescer which can be applied for practical purposes are rare in the literature. One of the primary reasons is that, as stated previously, interactions between the excited organic intermediate and the fluorescer in a ground state cannot be applied equally to all fluorescers in the oxalate chemiluminescence. Another reason is the requirement of the fluorescer to be chemically inert towards an oxidant such as hydrogen peroxide, an essential component in the oxalate chemiluminescence. If not, chemiluminescence time is shortened, thereby causing applications to commercial purposes to be difficult where long duration is required.

Anthracene derivatives are used as fluorescers for visible light such as blue, green, yellow-green and yellow light, as are seen in most commercial chemiluminescent products. Whereas perylenedicarboximide derivatives and pentacenes are used as fluorescers for red chemiluminescence.

Considering various applications including military purposes where it is crucial to discern obviously colored objects and to read figures and maps in the dark, the importance of developing white light can be easily understood. White light in principle can be produced by overlapping red, green, and blue, the essential three basic primary colors of light. But, up to present, there have been only a few reports on the production of white light utilizing chemiluminescence in spite of the extensive efforts by many researchers. One of the primary reasons is obviously due to the different chemical stabilities of each fluorescer producing the three basic primary colors, thereby causing inconsistency in the emitting color depending on the duration time.

Previous reports on the production of white light are described in U.S. Pat. Nos. 4,717,511 and 4,678,608, which teach that white light is produced from a composition comprising an anthracene-based fluorescer producing blue or green light and an N,N'-bis(2,5-di-t-butylphenyl)-3,4,9,10-perylenedicarboximide represented by Formula 1 below:

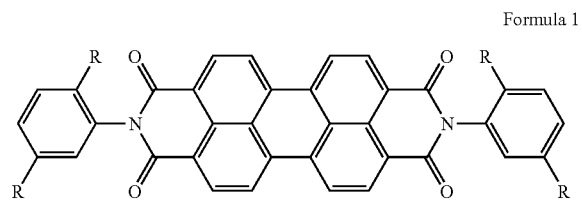

Formula 1 wherein R is a t-butyl group.

But, in addition to the compound N,N'-bis(2,5-di-t-butylphenyl)-3,4,9,10-perylenedicarboximide of Formula 1, most perylene compounds currently used as chemiluminescent dyes have negligible solubilities in organic solvents, including a compound represented by Formula 2 below:

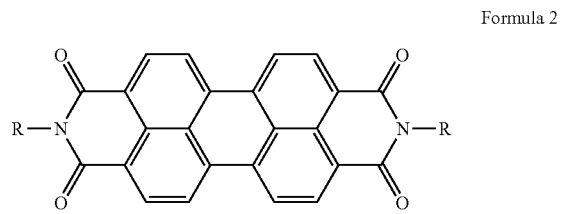

Formula 2 wherein R is an alkyl or aryl group.

Solubilities in 100 mL of chloroform at 25° C. and synthetic yields according to various substituents of the compound of Formula 2 are shown in Table 1 below.

TABLE 1

| R | Solubility (mg) | Yield (%) |
|---|---|---|
| Hexyl | 23 | 76 |
| Dodecyl | 8.5 | 78 |
| Octadodecyl | 1.8 | 38 |
| Aryl | 3.2 | 42 |
| Cyclopropyl | 6.6 | 22 |
| Cyclobutyl | 80 | 84 |
| Cyclopentyl | 89 | 58 |
| Cyclohexyl | 61 | 44 |
| Cycloheptyl | 19 | 88 |
| Cyclooctyl | 2.7 | 53 |
| Cyclononyl | 9.8 | 66 |
| Cyclodecyl | 9.8 | 40 |
| Cycloundecyl | 65 | 50 |
| Cyclododecyl | 140 | 45 |
| Cylclotridecyl | 15 | 40 |
| Cyclotetradecyl | 1500 | 43 |
| Cyclopentadecyl | 330 | 29 |
| 1-Ethylpropyl | 0.49 | 46 |
| 1-Propylbutyl | 0.41 | 37 |
| 1-Butylpentyl | 3.8 | 42 |
| 1-Penylhexyl | 81 | 26 |
| 1-Hexylheptyl | 780 | 41 |

As shown in Table 1, the perylene compounds of Formula 2 show low solubilities in the organic solvent, except for the case where the substituent is a cyclotetradecyl group, as well as low synthetic yields.

Since the compound of Formula 2 shows a very low solubility in an organic solvent, it is precipitated at low temperature when it is used as a fluorescer. In particular, when the compound of Formula 2 is combined with other fluorescers, it exhibits a very low light intensity. Hence, the use of the compound of Formula 2 for chemiluminescence has a problem of difficult production of brighter and purer white light.

In conclusion, it is very important to select a fluorescer which shows higher solubility in organic solvents and increases light intensity due to good fluorescence in order to stably emit brighter and purer white light at low temperature. Based on this importance, the present inventor has extensively conducted research through the years with the aim of developing an oxalate chemiluminescent composition capable of producing white light, and as a result, accomplished the present invention.

SUMMARY OF THE INVENTION

Therefore, it is an object of the present invention to provide an oxalate chemiluminescent composition capable of stably producing brighter and purer white light even at low temperature.

In order to accomplish the above object of the present invention, there is provided a chemiluminescent composition producing white light, comprising an oxalate solution and an activator solution wherein the oxalate solution includes a perylene compound, a fluorescer, an oxalate compound and a solvent, the activator solution includes hydrogen peroxide, a solvent and a catalyst, and the perylene compound includes a 1,6,7,12-tetrahaloperylenedicarboximide represented by Formula 3 below:

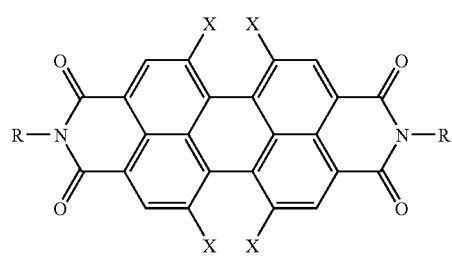

Formula (3)

wherein R is an alkyl or aryl group, and X is Cl or Br.

Perylene compounds containing four halogen atoms, like the compound of Formula 3, show extremely high solubilities and highly brilliant orange fluorescences, compared to conventional perylene compounds used for oxalate chemiluminescence. Accordingly, the use of the perylene compound of Formula 3 for chemiluminescence enables the stable production of brighter and purer white light.

The compound of Formula 3 is preferably a perylene compound wherein R is a $C_{1-20}$ alkyl group.

It is particularly preferred that the compound of Formula 3 is N,N'-dihexyl-1,6,7,12-tetrachloroperylene-3,4,9,10-dicarboximide (in the above Formula 3, R is a hexyl group, and X is Cl) represented by Formula 4 below:

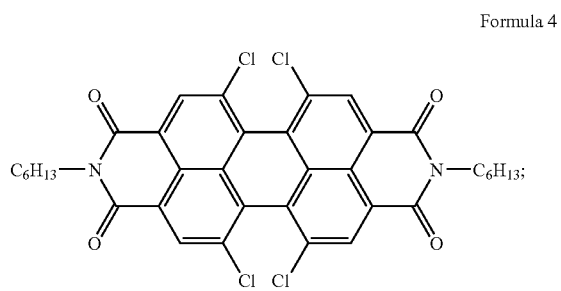

Formula 4

N,N'-didodecyl-1,6,7,12-tetrachloroperylene-3,4,9,10-dicarboximide (in the above Formula 3, R is a dodecyl group, and X is Cl) represented by Formula 5 below:

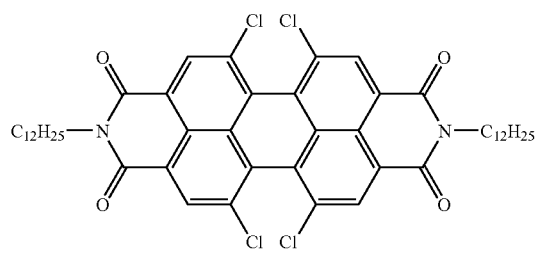

Formula 5

In addition, the compounds of Formula 3 are preferably those wherein R is an aryl group, particularly, a substituted aryl group.

The compound of Formula 3 can be readily prepared in high yields of 90% or more by refluxing the perylenedicarboximide compound of Formula 2 above in an organic solvent while passing chlorine gas therethrough.

Since the perylene compound used in the present invention, i.e., the compound 1,6,7,12-tetrahaloperylenedicarboximide of Formula 3 containing four halogen atoms, shows extremely high solubility and superior fluorescence, compared to conventional perylene compounds used for oxalate chemiluminescence, it produces stable chemiluminescence even at low temperature.

Solubilities of the compound of Formula 3 wherein R is a hexyl or dodecyl group and X is Cl, and the compound of Formula 2 wherein R is a hexyl or dodecyl group in 100 mL of chloroform at 20° C. are shown in Table 2 below.

TABLE 2

| R | Perylenedicarboximide of Formula 2 | 1,6,7,12-tetrahaloperylenedicarboximide of Formula 3 |
|---|---|---|
| Hexyl | 23 mg | 72 g |
| Dodecyl | 8.5 mg | 65 g |

The results of Table 2 show that the solubility of the perylene compound of Formula 3 is tremendously increased. Accordingly, when the compound 1,6,7,12-tetrahaloperylenedicarboximide of Formula 3 is used together with a highly soluble blue or green fluorescer or a mixture thereof, the chemiluminescent composition can stably emit brighter and purer white light even at low temperature.

Blue fluorescers that can be mixed with the perylene compound to produce white light include known blue light-emitting fluorescers. Preferred is a 2-chloro-9,10-bis(4-substituted phenyl)anthracene represented by Formula 6 below:

Formula 6

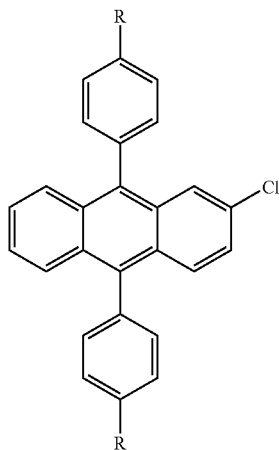

wherein R is an alkyl or alkoxy group.

Among anthracene compounds of Formula 6, 2-chloro-9,10-bis(4-methylphenyl)anthracene (in the above Formula 6, R is a methyl group), and 2-chloro-9,10-bis(4-methoxyphenyl)anthracene (in the above Formula 6, R is a methoxy group) are more preferred.

Green fluorescers that can be mixed with the perylene compound to produce white light include known green light-emitting fluorescers. 2-ethyl-9,10-bis(phenylethynyl)anthracene is preferred.

The chemiluminescent composition stably producing white light according to the present invention comprises: an oxalate solution including the compound 1,6,7,12-tetrahaloperylenedicarboximide of Formula 3 and a fluorescer; and an activator solution. More specifically, the chemiluminescent composition of the present invention comprises: an oxalate solution including a green fluorescer, a blue fluorescer or a mixture thereof, the compound 1,6,7,12-tetrahaloperylenedicarboximide of Formula 3, an oxalate compound and a solvent; and an activator solution including a peroxide, a catalyst and an organic solvent.

The oxalate compound used as one component of the oxalate solution may be a common compound used for chemiluminescence. In the present invention, bis(2,4,5-trichloro-6-carbopentoxyphenyl)oxalate was used.

The solvent used as one component of both the oxalate solution and the activator solution includes organic solvents such as esters and tertiary alcohols used in common oxalate chemiluminescent compositions. These organic solvents can be used alone or in combination. Aromatic esters, e.g., dibutyl phthalate, and butyl benzoate are desirable for the oxalate solution, and dimethyl phthalate is desirable for the activator solution.

All weak basic compounds, such as salicylate salts, can be used as catalysts for the activator solution along with the peroxide, but lithium and sodium salts of salicylates are desirable, since they are not precipitated at low temperature. As the hydrogen peroxide used in the activator solution, an aqueous hydrogen peroxide solution in which the peroxide content is controlled within the range of 30~90% are used.

The composition of the oxalate solution can be varied according to the intended purpose. Preferably, the oxalate solution includes 0.001~0.01% by weight of the compound 1,6,7,12-tetrahaloperylenedicarboximide, 0.1~0.4% by weight of the blue or green fluorescer or a mixture thereof, 8~15% by weight of the oxalate compound and the balance of the organic solvent.

Likewise, the composition of the activator solution can be varied according to the intended purpose. Preferably, the activator solution includes 1~5% by weight of the peroxide, 0.005~0.05% by weight of a salicylate salt as the catalyst and the balance of the organic solvent. At this time, the organic solvent is preferably a mixture of t-butanol and an ester solvent in a ratio of 1:5~9.

When the oxalate solution and the activator solution are mixed from 2.5:1 to 3.5:1 by volume ratio, brighter and purer white light is emitted during the period of 1 to 24 hours.

DESCRIPTION OF THE PREFERRED EMBODIMENTS

The present invention will now be described in more detail with reference to the following preparative example, examples and comparative examples. However, these examples are given for the purpose of illustration and are not to be construed as limiting the scope of the invention.

PREPARATIVE EXAMPLE 1

N,N'-didodecyl-1,6,7,12-tetrachloro-3,4,9,10-perylenedicarboximide

To a 250 mL flask was added 10 g of N,N'-didodecyl-3,4,9,10-perylenedicarboximide and 100 mL of chloroform, followed by refluxing while passing chlorine gas therethrough for 12 hours. After evaporation of the solvent under reduced pressure, 100 mL of methanol was added and stirred for 1 hour. After filtration, the crude product was washed with methanol and dried to give 11.30 g of the title compound (yield: 90%) as an orange solid.

Analytical results of m.p, $^1$H-NMR, FT-IR and UV/VIS measurements indicate that the compound is N,N'-didodecyl-1,6,7,12-tetrachloro-3,4,9,10-perylenedicarboximide.

M.p: 188° C. $^1$H-NMR (200 MHz, CDCl$_3$): 0.84–0.98 (t, 6H), 1.26–1.74 (m, 40H), 4.17–4.24 (t, 4H), 8.68 (s, 4H) FT-IR (KBr): 1702, 1665 cm$^{-1}$ UV/VIS (CHCl$_3$): 426, 487, 519 nm

EXAMPLE 1

(a) Preparation of Oxalate Solution 128 g of bis(2,4,5-trichloro-6-carbopentoxyphenyl)oxalate was charged into a reaction vessel and then 870 g of dibutyl phthalate was added thereto. The resulting mixture was stirred under nitrogen atmosphere and heated to 120° C. After the solution was cooled to 60° C., 2 g of 9,10-bis(4-methylphenyl)-2-chloroanthracene and 0.03 g of the N,N'-didodecyl-1,6,7,12-tetrachloroperylene-3,4,9,10-dicarboximide prepared in Preparative Example 1 were added, followed by cooling to room temperature, to prepare an oxalate solution.

(b) Preparation of Activator Solution

To 50 g of an 85% hydrogen peroxide solution was added dimethyl phthalate and t-butanol in a ratio of 80:20 until the final volume reached 1 L, followed by the addition of 0.18 g of a salicylate salt (0.18 g).

EXAMPLE 2

An oxalate solution and an activator solution were prepared in the same manner as in Example 1, except that 2-ethyl-9,10-bis(phenylethynyl)anthracene was used as a green fluorescer to prepare the oxalate solution instead of 9,10-bis(4-methylphenyl)-2-chloroanthracene.

COMPARATIVE EXAMPLE 1

An oxalate solution and an activator solution were prepared in the same manner as in Example 1, except that N,N'-bis(2,5-di-tert-butylphenyl)-3,4,9,10-perylenedicarboximide was used to prepare the oxalate solution instead of N,N'-didodecyl-1,6,7,12-tetrachloroperylene-3,4,9,10-dicarboximide.

COMPARATIVE EXAMPLE 2

An oxalate solution and an activator solution were prepared in the same manner as in Comparative Example 1, except that 2-ethyl-9,10-bis(phenylethynyl)anthracene was used as a green fluorescer to prepare the oxalate solution instead of 9,10-bis(4-methylphenyl)-2-chloroanthracene.

EXPERIMENTAL EXAMPLE 1

The oxalate solutions and the activator solutions prepared in Examples 1 and 2, and Comparative Examples 1 and 2 were mixed in a volume ratio of 3:1 to chemiluminescent compositions, respectively. After the four compositions were placed in a box (dimension: 28 cm×25 cm×13 cm) where light was completely blocked, the intensity of white light produced was measured using an illuminance meter (Model T-10M, MINOLTA, Sensor Probe Model T-10M receptor) at a distance of 1.5" from the respective luminescent bodies in a thermostat at 75° F. with the passage of time. The results are shown in Table 3 below.

EXPERIMENTAL EXAMPLE 2

The procedure was repeated in the same manner as in Experimental Example 1, except that the temperature of the thermostat was set to −25° F.

The measured intensities of white light are shown in Table 3 below.

chemiluminescent dye according to the present invention was increased by about 10–20%, compared to that in the chemiluminescent compositions comprising the perylene compound of Formula 1 currently used as a chemiluminescent dye.

In addition, the light intensity at a relatively low temperature (−25° F.) in the chemiluminescent 15 compositions comprising the perylene compound of Formula 5 as a chemiluminescent dye according to the present invention was drastically increased, compared to that in the chemiluminescent compositions comprising the perylene compound of Formula 1 currently used as a chemiluminescent dye. This is because the solubility of the perylene compound currently used for chemiluminescence is very poor at low temperature and eventually the dye precipitates. In contrast, in the case where the perylene compound of Formula 5 was used as a chemiluminescent dye to produce white light, the solubility of the dye was very high and no precipitates were formed even at low temperature, which confirms that white light can be stably produced over a long period of time.

As apparent from the above description, since the compound 1,6,7,12-tetrahaloperylenedicarboximide containing four halogen atoms used in the chemiluminescent composition producing white light of the present invention shows extremely high solubility and highly brilliant orange fluorescence, it enables the production of brighter and purer white light in the presence of a blue or green fluorescer. In particular, since the white light produced in the chemiluminescent composition of the present invention is stable even at low temperature (−25° F.), it is expected to be suitable for many applications not only in commercial purposes but also in military purposes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A chemiluminescent composition producing white light, comprising:
    an oxalate solution consisting of a perylene compound, a fluorescer, an oxalate compound and a solvent; and
    an activator solution consisting of hydrogen peroxide, a solvent and a catalyst
    wherein the perylene compound includes a 1,6,7,12-tetrahaloperylenedicarboximide represented by Formula 3 below:

TABLE 3

| Experimental Example No. | Chemiluminescent composition | Temp. (° F.) | Time (h) | | | | | | | | |
|---|---|---|---|---|---|---|---|---|---|---|---|
| | | | 0.25 | 1 | 2 | 3 | 4 | 5 | 6 | 7 | 8 |
| Experimental Example 1 | Example 1 | 75 | 11.42 | 6.76 | 4.04 | 3.25 | 2.15 | 1.39 | 0.94 | 0.73 | 0.54 |
| | Comparative Example 1 | | 9.61 | 5.67 | 3.47 | 2.52 | 1.73 | 1.19 | 0.93 | 0.70 | 0.51 |
| | Example 2 | | 61.93 | 39.8 | 21.14 | 13.51 | 8.81 | 5.65 | 3.60 | 2.31 | 1.51 |
| | Comparative Example 2 | | 47.36 | 25.16 | 16.08 | 10.42 | 7.8 | 4.28 | 2.75 | 1.81 | 1.21 |
| Experimental Example 2 | Example 1 | −25 | 10.48 | 5.38 | 3.44 | 2.62 | 2.21 | 1.97 | 1.60 | 1.42 | 1.18 |
| | Comparative Example 1 | | 1.35 | 0.85 | 0.52 | 0.24 | 0.10 | | | | |
| | Example 2 | | 20.86 | 10.38 | 7.54 | 6.51 | 4.98 | 3.71 | 3.42 | 2.56 | 2.41 |
| | Comparative Example 2 | | 1.87 | 1.18 | 0.61 | 0.30 | 0.11 | | | | |

As can be seen from Table 3, the light intensity (room temperature, 75° F.) in the chemiluminescent compositions comprising the perylene compound of Formula 5 as a

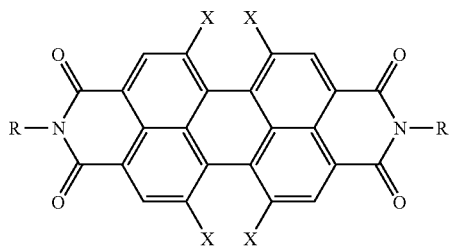

wherein R is an alkyl or aryl group, and X is Cl or Br.

2. The chemiluminescent composition according to claim 1, wherein the fluorescer is a blue light-emitting anthracene compound.

3. The chemiluminescent composition according to claim 2, wherein the blue light-emitting anthracene compound is a 2-chloro-9,10-bis(4-substituted phenyl)anthracene represented by Formula 6 below:

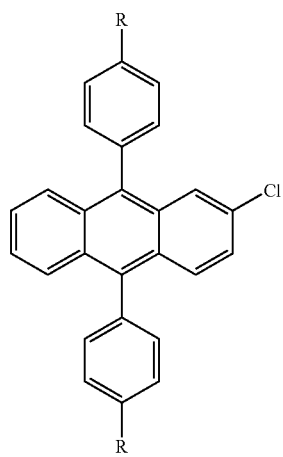

wherein R is an alkyl or alkoxy group.

4. The chemiluminescent composition according to claim 3, wherein the anthracene compound of Formula 6 is 2-chloro-9,10-bis(4-methylphenyl)anthracene or 2-chloro-9,10-bis(4-methoxyphenyl)anthracene.

5. The chemiluminescent composition according to claim 2, wherein the fluorescer further includes 2-ethyl-9,10-bis(phenylethynyl)anthracene emitting green light.

6. The chemiluminescent composition according to claim 1, wherein the compound of Formula 3 is a perylene compound wherein R is a $C_{1-20}$ alkyl group.

7. The chemiluminescent composition according to claim 6, wherein the compound of Formula 3 is N,N'-didodecyl-1,6,7,12-tetrachloroperylene-3,4,9,10-dicarboximide represented by Formula 5 below:

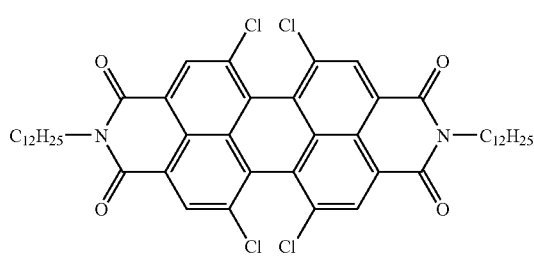

8. The chemiluminescent composition according to claim 1, wherein the compound of Formula 3 is a compound wherein R is an aryl group.

9. The chemiluminescent composition according to claim 1, wherein the fluorescer includes 2-ethyl-9,10-bis(phenylethynyl)anthracene emitting green light.

10. The chemiluminescent composition according to claim 1, wherein the oxalate compound is bis(2,4,5-trichloro-6-carbopentoxyphenyl)oxalate.

11. The chemiluminescent composition according to claim 1, wherein the solvent is an ester-based organic solvent.

12. A chemiluminescent composition producing white light, comprising:
an oxalate solution consisting of N,N'-didodecyl-1,6,7,12-tetrachloroperylene-3,4,9,10-dicarboximide represented by Formula 5 below:

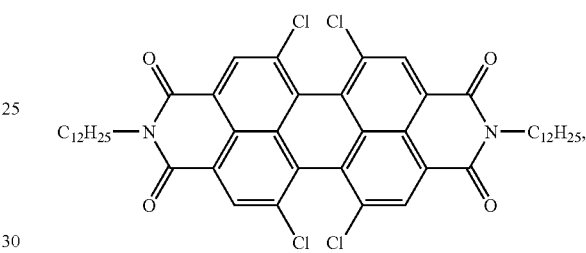

a fluorescer, an oxalate compound and a solvent; and
an activator solution consisting of hydrogen peroxide, a solvent and a catalyst
wherein the fluorescer is a blue light-emitting anthracene compound.

13. The chemiluminescent composition according to claim 12, wherein the blue light-emitting anthracene compound is a 2-chloro-9,10-bis(4-substituted phenyl)anthracene represented by Formula 6 below:

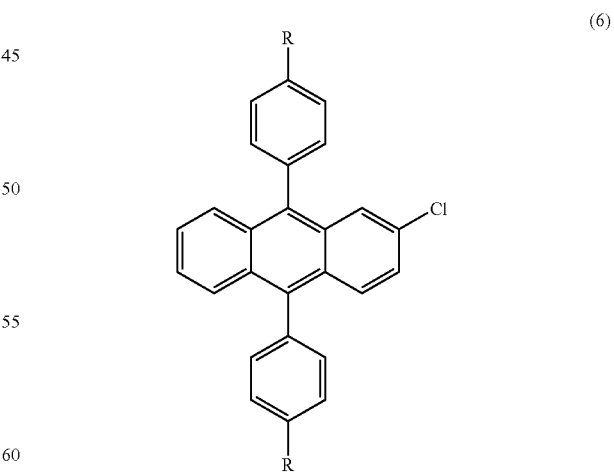

wherein R is an alkyl or alkoxy group.

14. The chemiluminescent composition according to claim 13, wherein the anthracene compound of Formula 6 is 2-chloro-9,10-bis(4-methylphenyl)anthracene or 2-chloro-9,10-bis(4-methoxyphenyl)anthracene.

15. The chemiluminescent composition according to claim 12, wherein the fluorescer includes 2-ethyl-9,10-bis(phenylethyl)anthracene emitting green light.

16. The chemiluminescent composition according to claim 12, wherein the oxalate compound is bis(2,4,5-trichloro-6-carbopentoxyphenyl)oxalate.

17. The chemiluminescent composition according to claim 12, wherein the solvent is an ester-based organic solvent.

* * * * *